(12) United States Patent
Raben

(10) Patent No.: US 8,062,575 B2
(45) Date of Patent: Nov. 22, 2011

(54) TIRE TESTING APPARATUS AND METHOD

(76) Inventor: Tom Raben, Evansville, IN (US)

( * ) Notice: Subject to any disclaimer, the term of this patent is extended or adjusted under 35 U.S.C. 154(b) by 350 days.

(21) Appl. No.: 11/973,251

(22) Filed: Oct. 5, 2007

(65) Prior Publication Data

US 2008/0084002 A1   Apr. 10, 2008

Related U.S. Application Data

(60) Provisional application No. 60/849,646, filed on Oct. 5, 2006.

(51) Int. Cl.
*B29D 30/00* (2006.01)
*G01M 3/02* (2006.01)
*B29C 35/00* (2006.01)

(52) U.S. Cl. ....... 264/501; 264/36.14; 425/29; 425/136; 425/170; 156/96; 156/909; 340/584; 73/40.5 R

(58) Field of Classification Search ............... 156/96, 156/909; 425/29, 34.1, 34.3
See application file for complete search history.

(56) References Cited

U.S. PATENT DOCUMENTS

| | | | | |
|---|---|---|---|---|
| 3,029,469 A | * | 4/1962 | Moore et al. | 425/33 |
| 3,701,145 A | * | 10/1972 | Bergin | 341/140 |
| 4,114,442 A | * | 9/1978 | Pratt | 374/113 |
| 4,120,193 A | * | 10/1978 | Tomsic et al. | 73/40 |
| 4,221,124 A | * | 9/1980 | Jones | 73/40 |
| 4,309,234 A | * | 1/1982 | Witherspoon | 156/96 |
| 4,441,107 A | * | 4/1984 | Chaborski et al. | 340/870.16 |
| 5,055,148 A | * | 10/1991 | Lindsay et al. | 156/96 |
| 5,237,308 A | * | 8/1993 | Nakamura | 340/588 |
| 5,713,666 A | * | 2/1998 | Seelin et al. | 374/126 |
| 6,401,524 B1 | * | 6/2002 | Incavo et al. | 73/40 |

FOREIGN PATENT DOCUMENTS

JP        04263395 A  *  9/1992

OTHER PUBLICATIONS

Stapenhurst, T., Mastering Statistical Process Control—A Handbook for Performance Improvement Using Cases, Elsevier, 2005, pp. 3-10.*

* cited by examiner

*Primary Examiner* — Philip Tucker
*Assistant Examiner* — William Bell
(74) *Attorney, Agent, or Firm* — Gary K. Price

(57) ABSTRACT

A computer based detecting system that detects a defective tire assembly during the curing process is disclosed. The system includes a plurality of temperature sensors connected to a processor of the computer system and further connected to each hose that is connected between a tire assembly inside an autoclave, and an external manifold of the autoclave. The processor receives data input from each of the temperature sensors and decodes the data to determine the current temperature of each sensor and simultaneously calculates the average temperature of all the temperature sensors connected. The processor compares the temperature reading of each station with the average temperature and notifies should the difference between the temperature average and temperature sensor reading equal or is greater than a selected temperature deviation.

10 Claims, 2 Drawing Sheets

TIRE TESTING APPARATUS AND METHOD

CROSS REFERENCES TO RELATED APPLICATIONS

U.S. Provisional Application for Patent No. 60/849,646, filed Oct. 5, 2006, with title "Tire Testing Apparatus and Method" which is hereby incorporated by reference. Applicant claims priority pursuant to 35 U.S.C. Par. 119 (e)(i).

Statement as to rights to inventions made under Federally sponsored research and development: Not Applicable

BACKGROUND OF THE INVENTION

1. Field of the Invention

The present invention relates to improved tire inspection equipment, and more particularly to an apparatus for inspecting the tire for defects during the curing process of a retread tire.

2. Brief Description of Prior Art

Tires have been retreaded for several decades according to a variety of methods. Retreading tires provides an economical way to gain additional use of a tire casing after wearing of the original tread.

In tire retreading operations, the worn tread is first stripped or buffed from the crown of the tire carcass in order to produce a surface suitable for bonding a new tread layer. A bonding layer and a new tread layer are built about the circumference of the buffed surface. In particular, the new tread layer is wrapped about the circumference of the tire casing over the bonding layer forming a retread tire assembly. The tire assembly bonding layer and new tread and carcass can then be placed within a flexible rubber envelope. The entire envelope, with the tire assembly disposed therein, can be placed within a curing chamber, i.e., an autoclave, and subjected to elevated pressure and temperature for a predetermined period of time. The combination of exposure to elevated pressure and temperature for a duration of time binds the bonding layer to both the tire casing and the new tire tread.

An autoclave is a large pressure and temperature controlled vessel having a capacity for several tire assemblies. In the autoclave, the tire assemblies are subjected to heat and pressure for a specified period. The chamber is normally heated to approximately Two Hundred Ten degrees Fahrenheit (210° F.) to Two Hundred Sixty degrees Fahrenheit (260° F.) and normally pressurized to approximately Eighty (80) psig to Eighty-Five (85) psig. An exhaust fitting of each tire assembly is individually connected to a hose that allows the pressure at the interior of the envelope to be controlled. The combination of pressure and temperature over time cures the bonding layer, permanently bonding the new tread to the casing.

The autoclave includes means for monitoring and controlling the amount of pressure the tire assemblies are subjected to inside the chamber, and further has means to control the temperature inside the chamber, as well as the time period the tire assemblies are subjected to the pressure and temperature. However, in the event an envelope having the tire assembly disposed therein has an air leak not detected, the new tire tread may not properly bond to the tire casing. Such problems can reduce the longevity of the retreaded tire and adversely impact application of the retreaded tire.

There is a need for an apparatus that eliminates the drawbacks in the conventional devices. In particular, there is a need for an apparatus and method that detects air leaks during the curing process for a retread tire. More particularly, there is a need for an apparatus and method that detects all leaks in the envelope and tire carcass, as well as the new tread and binding layer. The present invention fulfills these needs and provides further related advantages.

SUMMARY OF THE INVENTION

A computer based detecting system that detects a defective tire during the curing process is disclosed. The system includes a plurality of temperature sensors appropriately connected to a processor of the computer system. Each temperature sensor generates input data to the system. More particularly, the system includes connecting one of the plurality of temperature sensors to each hose that is connected between a tire assembly inside an autoclave, and an external manifold of the autoclave. The processor receives data input from each of the temperature sensors and decodes the data to determine the current temperature of each sensor. The processor at selected time intervals reads each temperature sensor and simultaneously calculates the average temperature of all the temperature sensors connected. The system displays each station, and the temperature sensor readings for each station, and average temperature, and prints a report that includes the time of day the temperature readings were taken. The processor compares the temperature reading of each station with the average temperature. Should the difference between the temperature average and temperature sensor reading equal or is greater than a selected temperature deviation, the display and printed report will note that deviations have occurred. In addition, the system preferably includes an output means such as an audible alarm such that when the temperature alarm threshold is exceeded, the processor is programmed to send a signal to the alarm in order to notify the operator that a deviation has occurred.

DESCRIPTION OF THE PREFERRED EMBODIMENT

In accordance with the present invention, a tire testing apparatus and method therefor is disclosed. More particularly, the disclosed apparatus and method relates to a means to detect air leaks in a tire assembly during the curing process of a retread tire. In the broadest context, the apparatus and method herein consists of components and steps configured with respect to each other so as to attain the desired objective.

Figure 1:
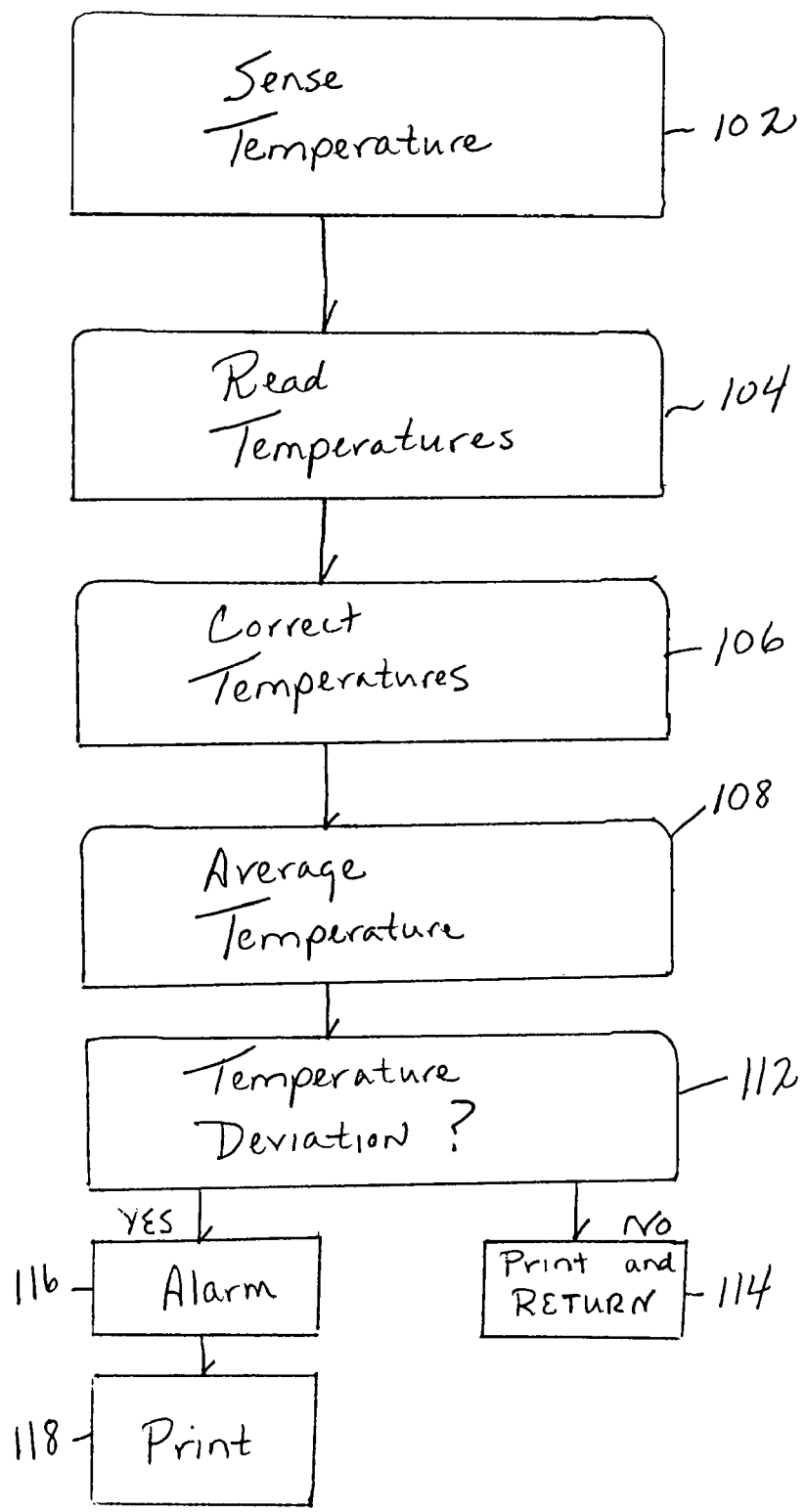
FIG. 1 represents a flow chart of the Preferred Embodiment of the present invention, a Tire Testing Apparatus and Method.
Figure 2:
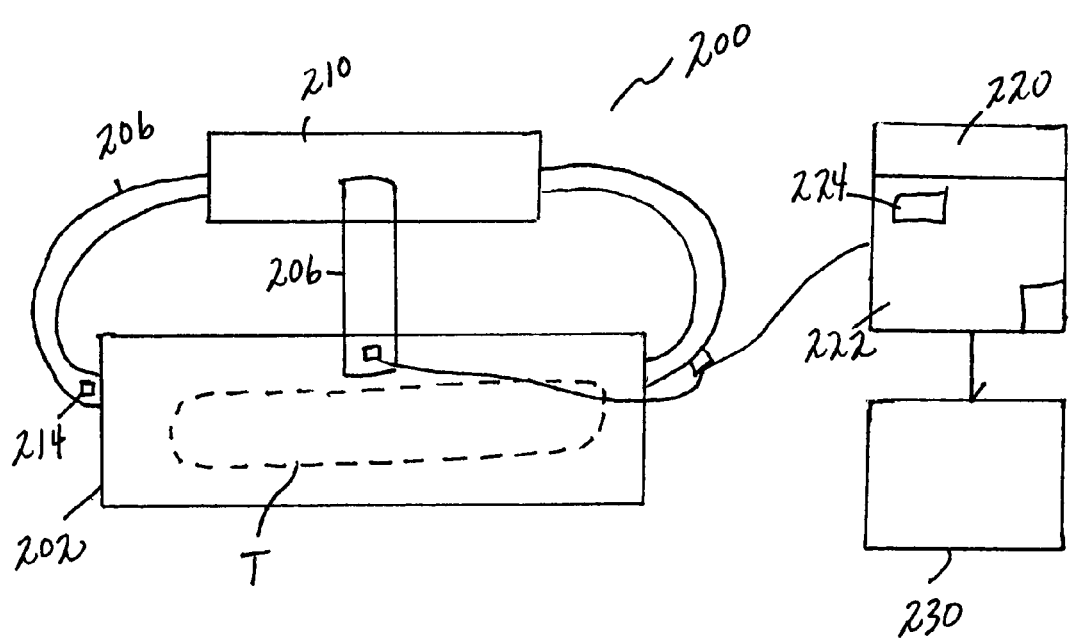
FIG. 2 is a block diagram of the system.

As discussed in the Brief Description of Prior Art, in the retreading process, the tire assembly (T) in phantom lines in FIG. 2 having a new tread layer is disposed within a flexible rubber envelope and placed within an autoclave 202 that subjects the tire assembly (T) to elevated pressure and temperature for a predetermined period of time. In the autoclave 202, an exhaust fitting of each tire assembly (T) is individually connected to a hose 206 that allows air to be expelled or injected into the interior of the envelope to be controlled. The combination of pressure and temperature over time cures the bonding layer, permanently mounting the new tread to the casing. Each hose 206 connected to the tire assembly (T) is connected to a source of heat and pressure such as an external manifold 210 that preferably includes a pressure gauge and control valve(s) for each station so that an operator can monitor and control the amount of pressure each tire assembly (T) is subjected to.

In the event an envelope containing the tire assembly (T) has a defect such as an air leak for example, the prior art autoclave does not include adequate detecting means to place the operator on notice of the defect. As a result, the new tire tread for the tire assembly may not properly bond to the tire casing which can reduce the longevity of the retreaded tire and adversely impact application of the retreaded tire.

The Applicant has determined that when a tire assembly (T) is defective and includes an air leak, heat within the tire assembly (T) escapes during the curing process through the hose 206 that extends from the tire assembly (T) to the external manifold 210 and/or pressure gauge. As such, while the autoclave 202 does not include adequate means to detect defective tire assemblies therein, constant monitoring of the temperature 102 of each hose 206 extending from the tire assembly can indicate a defective tire assembly.

In the present invention, a computer based detecting system 200 that detects a defective tire assembly (T) during the curing process is disclosed. While the system 200 is described herein as being implemented in software executed on a personal computer, the system 200 could be executed on any other type of computer as well, such as any laptop computer, handheld computer or data assistant, any larger mainframe type computer, etc. Still further, the system 200 described herein could be implemented in hardware elements such as in application specific integrated circuits as well as in typical software routines. It will also be understood that, as described herein, the different modules, routines or programs stored in a computer memory may be stored in any desired manner in volatile memory, such as in a magnetic type memory, random access memory, etc., as well as in any desired type of non-volatile memory. Still further, these routines may be embodied in hardware logic circuits (e.g., memories) of any desired types.

In the preferred embodiment, the system 200 includes a display device 220 such as an LCD screen, CRT screen, or other type display, a processing unit 222 and a database 224. In the preferred embodiment, the system 200 further includes a printer 230 to print out or to download reports or other data generated by the system 200.

The database 224 or memory storage unit may be a RAM on a hard drive or any other type of memory and is connected to the processing unit 222 via any appropriate input/output driver or device. The memory may be organized in any desired manner and may be accessed using the suitable database access software.

A number of different programs or routines may be stored and executed on the processing unit which, of course, includes a memory and a typical processor such as a general purpose processor of any desired type. The processing unit 222 may store and execute a number of modules or routines which are used to provide user input/output functions.

The processing unit 222 also includes a program store which stores the programs or routines (or the portions thereof currently being used) which are executing within the processor 222. The program store stores or implements the programs needed to perform the numerous tasks associated with the system 200 that will be described in more detail herein. The processing unit 222 also includes a number of input drivers, such as any standard keyboard input unit, mouse unit and the like. Still further, and importantly, the processing unit 222 stores and executes arbiter or controller that controls the order of and the timing of the execution of the different programs or modules within the processing unit 222. Thus, the controller arbitrates the timing and execution of the programs, routines or modules such as the programs within the program store, the input drivers to assure that these programs interact together in a seamless manner.

The system 200 further includes a plurality of temperature sensors 214 appropriately connected to the processor 222. Each temperature sensor 214 generates input data to the system 200. More particularly, the system 200 includes connecting one of the plurality of temperature sensors 214 to each hose 206 connected between a tire assembly (T) inside the autoclave 202 and an external manifold 210 and/or pressure gauge. In this regard, each hose 206 includes a portion, preferably a copper line or hose, referred to herein as the "external portion," that outwardly extends from the autoclave 202 to the manifold 210. A temperature sensor 214 is in communication with the external portion of the hose 206.

The processor 222 receives data input from each of the temperature sensors 214 and decodes the data to determine the current temperature of each sensor 214. The display and printer identifies the tire assembly ("station") in the autoclave 202 and displays the temperature for the temperature sensor 214 in communication with that station. In the preferred embodiment, the processor averages, i.e., totals the data inputs and divides by the total number of temperature sensors, and can simultaneously display the average temperature. In the event one or more stations are subjected to external heat such as where the sun for example, strikes a particular station or stations at various angles, those station(s) will have natural hot spots which could activate the alarm (as will be discussed) prematurely. The average temperature gives a more accurate sensing of the overall ambient temperature. As will be understood, the average is used by the processor as the data to drive the system and initiate the alarm sequence.

As an example of the algorithm used when temperature averaging is enabled, the alarm threshold can be set at a 20° F. deviation ("selected temperature deviation") of the multiple sensor average of each individual temperature sensor 214. As should be understood, this significantly reduces false alarms, while still monitoring for an extreme temperature. In application, the processor 222 at selected time intervals reads 104 each temperature sensor 214, corrects temperature reading 106 and simultaneously calculates the average temperature 108. The system 200 displays each station, and the temperature sensor readings for each station, and average temperature, and prints 114 a report that includes the time of day the temperature readings were taken. The processor compares the temperature reading of each station with the average temperature. Should the difference between the temperature average and temperature sensor reading equal or is greater than the selected temperature deviation 112, the display 220 and printed report 118 will note that deviations have occurred, or similar language. A system could also be set to measure specific pre set temperatures.

In addition, the system 200 preferably includes an output means such as an audible alarm 116 such that when the temperature alarm threshold is exceeded for a particular station(s), the processor 222 is programmed to send a signal to the alarm 116 in order to notify the operator that a deviation has occurred. The system 200 further includes a means to allow the operator to stop the alarm once properly notified.

The output can be integrated with other types of notification, such as a horn, lights, that are energized by an alarm system from the processor. The processor may be further programmed to activate the alarm, horn and/or lights in a particular sequence or tone to attract the operator's attention.

In the preferred embodiment, the processing routine as described is automatically initiated by the processor every approximately five minutes during each curing process. However, it should be understood that other elapsed time intervals can be used. Further, while the temperature alarm threshold described herein was a 20° F. deviation from the average temperature, other temperature alarm thresholds can be selected.

Also, while the output means described included an audible alarm in order to notify the operator that a deviation has occurred, it should be understood that the output means may include control means known in the art to automatically shut-off the pressure directed to the defective tire assembly. In application, should the processor determine the difference between the temperature average and temperature sensor reading is equal to or greater than the selected temperature deviation, the processor is programmed to send a signal to the control means in order to manually shut-off the pressure directed to the defective station.

Each station can be manually assigned a correction 106, a "plus or minus deviation" that is manually entered by the user and stored in the processor 222. The plus or minus deviation represents a correction adjustment to each station's temperature reading in order to recognize characteristics of each station. For example, a particular station may always have a temperature two degrees higher than the other stations. As such, the plus or minus deviation for that particular station would be minus two. Likewise, if a particular station is characteristically two degrees cooler in temperature then, its plus or minus deviation would be plus two. As will be understood, the temperature readings used to calculate the average as described in the preferred embodiment are each adjusted by the plus or minus deviation prior to calculating the average.

As an example, the alarm threshold can be set at a 20 degree F. deviation ("selected temperature deviation") of the multiple sensor average of each individual temperature sensor. In application, the processor at selected time intervals reads each temperature sensor, simultaneously adjusts the temperature reading by that station's plus or minus deviation (the "adjusted temperature") and calculates the average temperature. The system displays each station, and the temperature sensor readings for each station, the plus or minus deviation, and average temperature, and prints a report that includes the time of the day the temperature readings were taken. The processor compares the adjusted temperature reading of each station with the average temperature. Should the difference between the temperature average and adjusted temperature sensor reading equal or is greater than the selected temperature deviation, the display and printed report will note the deviations have occurred or similar language. The system preferably includes an output means such as an audible alarm such that when the temperature alarm threshold is exceeded for a particular station(s), the processor is programmed to send a signal to the alarm in order to notify the operator that a deviation has occurred. The system further includes a means to allow the operator to stop the alarm once properly notified.

Although the description above contains many specificities, these should not be construed as limiting the scope of the invention but as merely providing illustrations of some of the presently preferred embodiments of this invention. Thus the scope of the invention should be determined by the appended claims in the formal application and their legal equivalents, rather than by the examples given.

I claim:

1. A computer based detecting system that detects a defective tire assembly during a curing process comprising:
    a computer processor,
    a plurality of temperature sensors appropriately connected to said processor, at least one hose that is connected to a station having a tire assembly inside an autoclave and an external manifold of the autoclave wherein each of at least one hose define an external portion that outwardly extends from said autoclave and, wherein each temperature sensor is in communication with said external portion of each of at least one hose,
    said each temperature sensor generates input data to said processor,
    wherein said input data includes a plurality of temperature values one from each sensor and wherein a correction value is applied to each of said temperature values in order to correct for known temperature deviations within each station,
    wherein said processor calculates an average of said plurality of temperature values and compares each said temperature value with said average to compute a difference value, and wherein said processor upon sensing said difference value greater than a preset value sends an alarm signal to an output device indicating a defect in said tire assembly.

2. The system as recited in claim 1, wherein said output device is an audible alarm.

3. The system as recited in claim 1, wherein said manifold supplies heat and pressure to said autoclave to cure said tire assembly.

4. The system as recited in claim 1, wherein said correction value is manually entered and stored in the processor.

5. A method for detecting a defective tire assembly during a curing process, said method comprising the steps of:
    decoding at selected time intervals data received from a plurality of temperature sensors appropriately connected to a processor of a computer system, wherein said data includes a plurality of temperature values one from each sensor and wherein each of said temperature sensors are connected to a hose of a tire assembly station, said station comprising a tire assembly inside an autoclave, and an external manifold;
    applying a correction value for each of said temperature values in order to correct for known temperature deviations within each station; calculating the average temperature of all the temperature sensors;
    displaying the temperature sensor reading for each station and the average temperature;
    comparing the temperature reading of each station with the average temperature,
    calculating the difference between the temperature average and temperature sensor reading; and
    activating an output indicating a leak when said temperature sensor reading is equal or is greater than a selected temperature deviation.

6. The method as recited in claim 5, wherein said output is an audible alarm.

7. The method as recited in claim 5, including the step of manually entering said correction value for each of said temperature sensors and storing said values in the processor.

8. A method for detecting a defective tire assembly during a curing process, said method comprising the steps of:
    supplying heat and pressure from a source of heat to an autoclave through supplies;
    decoding, at selected time intervals, temperature data received from a plurality of temperature sensors connected to said supplies of a tire assembly station, said station comprising a tire assembly inside an autoclave, and said external source;
    applying a correction value to each, temperature data, said correction value representing a known temperature deviation within each station;

calculating the average temperature of all the temperature sensors;

displaying a station identifier, the temperature sensor reading for each station, the average temperature, and the time of day the temperature readings were taken;

comparing the temperature reading of each station with the average temperature;

calculating the difference between the temperature average and temperature sensor reading; and, activating an output when said temperature sensor reading is equal or is greater than a selected temperature deviation to indicate a leak.

9. The method as recited in claim 8, wherein said output is an audible alarm.

10. The method as recited in claim 9, further including the step of applying said correction to said temperature sensor reading prior to calculating said average temperature.

* * * * *